US006435358B1

(12) United States Patent
Decal

(10) Patent No.: US 6,435,358 B1
(45) Date of Patent: Aug. 20, 2002

(54) TONGS AND SPOON HOLDER

(76) Inventor: Diego L. Decal, 6390 Boulevard of Champions, North Lauderdale, FL (US) 33068

( * ) Notice: Subject to any disclaimer, the term of this patent is extended or adjusted under 35 U.S.C. 154(b) by 0 days.

(21) Appl. No.: 09/848,155

(22) Filed: May 4, 2001

(51) Int. Cl.$^7$ .................................................. A47F 7/00
(52) U.S. Cl. ...................................................... 211/70.7
(58) Field of Search ............................... 211/70.7, 70.6; 248/37.7; D7/641

(56) References Cited

U.S. PATENT DOCUMENTS

| | | | |
|---|---|---|---|
| 723,729 A | * | 3/1903 | Powles, Sr. |
| D164,236 S | * | 8/1951 | Hassler |
| 4,152,831 A | * | 5/1979 | Davies |
| 4,515,332 A | | 5/1985 | Scharfy |
| 4,834,328 A | * | 5/1989 | Hall |
| D304,280 S | * | 10/1989 | Leighton |
| 5,141,189 A | | 8/1992 | Andrew |
| 5,208,084 A | * | 5/1993 | Rutz |
| 5,678,790 A | | 10/1997 | Dwyer |
| 6,123,220 A | * | 9/2000 | Williams |
| 6,173,875 B1 | | 1/2001 | Eriksson |

* cited by examiner

Primary Examiner—Alvin Chin-Shue
Assistant Examiner—Sarah Purol
(74) Attorney, Agent, or Firm—Alvin S. Blum

(57) ABSTRACT

A holder is provided with a base having one or two depressions in its upper surface that can serve as a rest for one or two spoons when they are not in use to prevent their being contaminated by, or contaminating, a surface on which they are temporarily rested. The holder can also be used to temporarily hold a pair of tongs of the type that have two long handles pivotally joined at one end with a spring urging the free ends apart. The holder has a base with a pair of spaced-apart upright elements extending upward from the base. The handles are forced against the upright elements by the spring, which holds the tongs securely in a partially closed position for ease of grasping, and for economy of space. The one or two depressions are positioned to catch any drippings from the free ends of the tongs for sanitary operation.

11 Claims, 2 Drawing Sheets

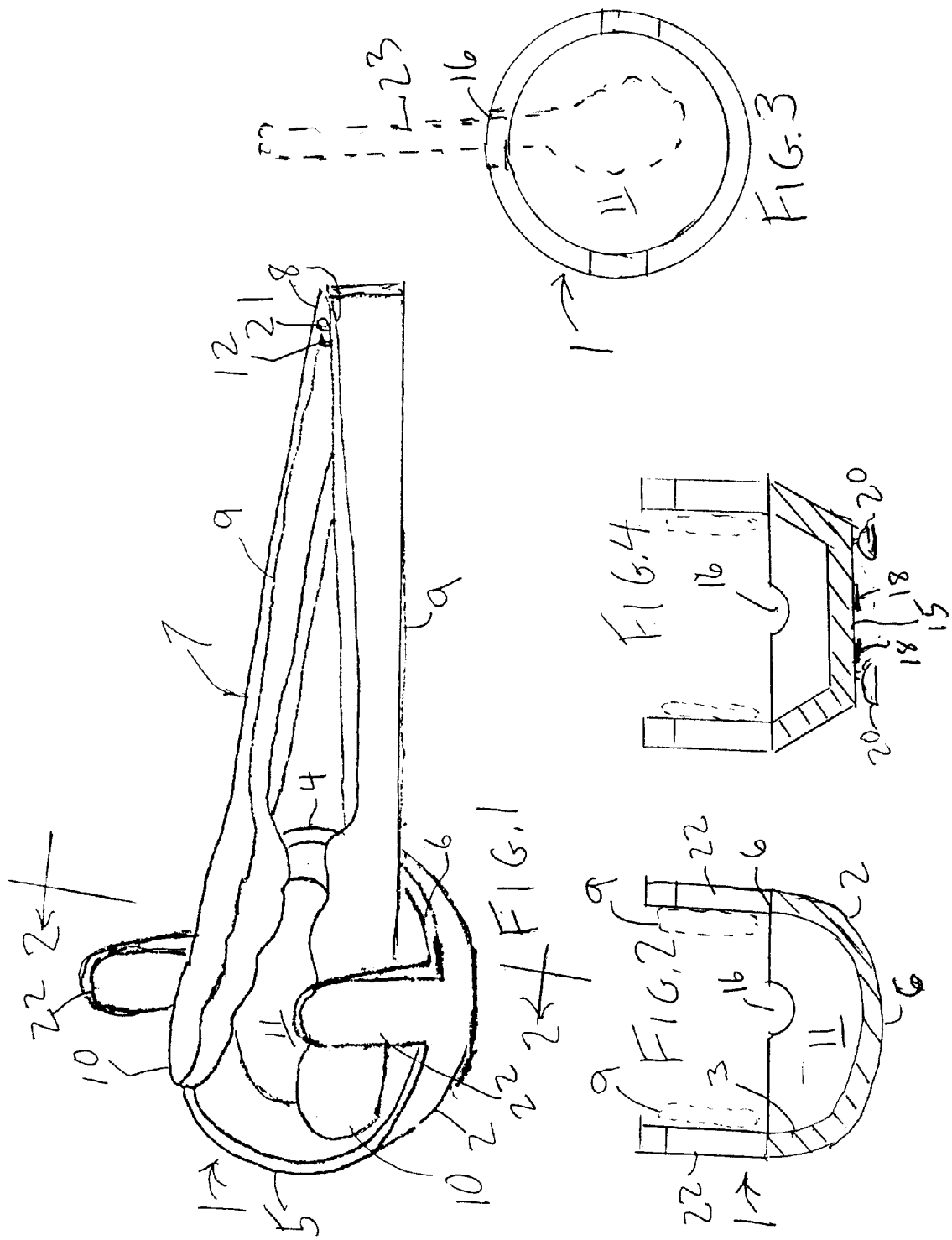

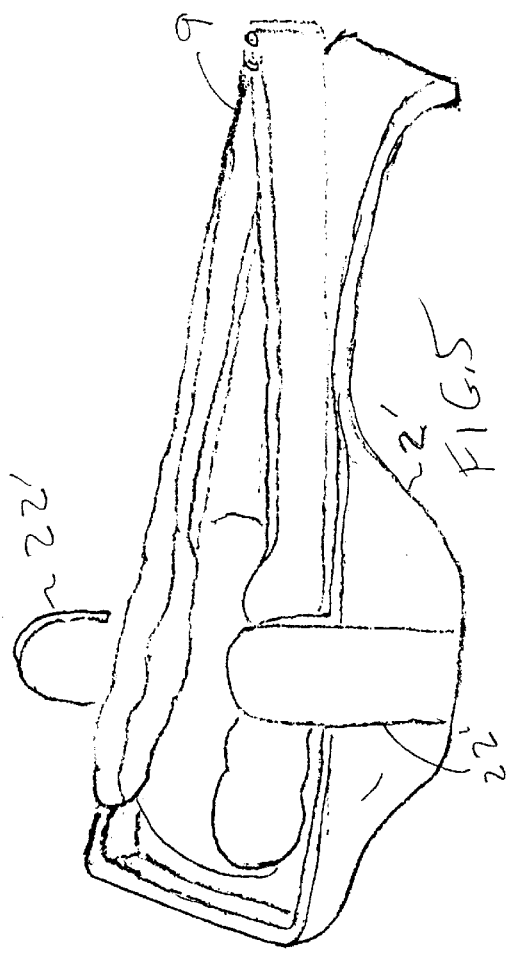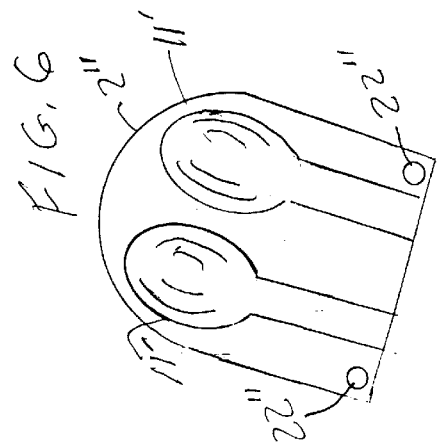

TONGS AND SPOON HOLDER

This invention relates to kitchen apparatus, and more particularly to a holder that will hold a pair of tongs and/or a spoon.

BACKGROUND OF THE INVENTION

Many cooks employ tongs in their operations. Most common are tongs with two elongate handles pivotally joined at their first ends. Their second ends are adapted for grasping. Spring bias at the first ends urges the second ends apart. Cooks frequently pick up the tongs with one hand, apply it to the food and lay it down with the second ends soiled with food. They may not be easy to grasp when they must be used again, and they may contaminate the surface on which they were rested. The second ends may also be contaminated from the surface upon which they were rested. They are quite wide when not in use, so they take up considerable space when laid down between uses. Spoon rests such as those disclosed in U.S. Pat. Nos. Des363,416 and Des274,684 are well known in the art to provide a cook with a clean place to rest a spoon between uses. It would be useful to have a tongs holder that would not take up as much space as the tongs when they are simply laid down. It would be useful if the tongs holder would prevent contamination to and from the second end of the tongs. It would be useful if the tongs holder could also serve as a spoon rest when not holding tongs to conserve counter and stovetop space.

SUMMARY OF THE INVENTION

It is accordingly an object of the invention to provide a tongs holder that will prevent contamination to and from the second ends of the tongs. It is another object that the holder hold the tongs in the partially closed position for space conservation and for ease of grasping. It is yet another object that the device serve as a rest for a spoon when not holding a pair of tongs. It is yet another object that the device hold the tongs securely by using the spring bias of the tongs to press each of the two handles against a member extending upwardly from the surface of the holder.

The tongs holder of the invention comprises a base having an upper surface, a rear end and a forward end; and a pair of spaced-apart upright elements extending upwardly from the upper surface. The upright elements are adapted for engaging the handles of the tongs intermediate their free and pivoted ends to hold the tongs there securely by means of the spring bias. One or more depressions in the upper surface are positioned to catch drippings from the free ends of the tongs and to also serve as a rest for one or more spoons.

These and other objects, features, and advantages of the invention will become more apparent when the detailed description is studied in conjunction with the drawings in which like elements are designated by like reference characters in the various drawing figures.

BRIEF DESCRIPTION OF THE DRAWINGS

FIG. 1 is a perspective view of a holder of the invention in use.

FIG. 2 is a sectional view taken on line 2—2 of FIG. 1.

FIG. 3 is a top view of the holder of FIG. 1.

FIG. 4 is a sectional view as in FIG. 2 of another embodiment of the invention.

FIG. 5 is a perspective view of another embodiment of the invention.

FIG. 6 is a top view of another embodiment of the invention.

DETAILED DESCRIPTION OF PREFERRED EMBODIMENTS

Referring now to the drawing FIGS. 1–3, the tongs and spoon holder 1 of the invention is adapted to securely hold a pair of tongs 7 of the type having a pair of handles 9 with first ends 8 pivotally joined by pivot 21 with spring 12 forcing the second, or grasping ends 10 apart. The holder 1 has a base 2, a rear end 4, a front end 5, a round lower surface 6, and an upper surface 3 with a depression 11 to catch drippings from the end 10 of the tongs. A pair of upright elements 22 extend upwardly from the upper surface 6 of the base. They are adapted to engage the handles 9 of the tongs intermediate their ends. The spring bias urges the handles 9 against the elements thereby holding the tongs securely in their partially closed condition. They take up less room this way and are more easily grasped by the user as needed. The weight of the ends 9 cause the holder to tilt until the ends 9 are resting on a support surface. The round bottom makes it easy for the holder to pivot to a position most comfortable for the user. A spoon 23 may be rested in the depression 11 with the handle of the spoon in the notch 16 in the outer rim of the base. When tong or spoon are so rested in the device, they do not contaminate surfaces and they do not become contaminated, for more sanitary food processing, and working conditions. A user soon becomes accustomed to its use, thereby knowing where to find the utensil without searching.

Referring now to the embodiment of FIG. 4, another embodiment of the invention is similar to that of FIG. 1, except that the bottom 15 is flat. The flat bottom 15 may be a high friction surface such as cork to prevent movement. Alternatively, it may be provided with magnets 18 or suction cups 20 to hold the device in place.

Referring now to FIG. 5, another embodiment of the invention is shown in which the base 2' is elongate to provide a rest for all of the handles 9, and the upright elements 22' are affixed to the outside of the base.

Referring now to FIG. 6, the invention may comprise a solid base 2" with two depressions 11' disposed to each catch the drippings from a tong end when the tongs are held in place against the upright elements 22". The device may also serve as rests for two spoons. While I have shown and described the preferred embodiments of my invention, it will be understood that the invention may be embodied otherwise than as herein specifically illustrated or described, and that certain changes in form and arrangement of parts and the specific manner of practicing the invention may be made within the underlying idea or principles of the invention.

What is claimed is:

1. A holder for supporting a spoon and a pair of tongs in a sanitary manner, in which the tongs have two elongate handle members pivotally joined at their first ends, with grasping second ends that are urged apart by spring bias, the holder comprising:

a) a base having a lower surface for resting upon a support surface, an upper surface, a rear end and a forward end;

b) a pair of upright elements extending upwardly from the upper surface and spaced apart from one another, the upright elements adapted for engaging the handles of the tongs intermediate the first and second ends of the tongs by the spring bias forcing the handles against the upright elements; and c) at least one depression in the upper surface adapted to serve as a spoon rest, and also positioned to catch drippings from the second ends of the tongs when the tongs are held by the spring bias urging the handle elements against the upright elements.

2. A holder for holding a pair of tongs securely in a sanitary manner on a support surface, the tongs having two elongate handle members pivotally joined at their first ends, with grasping second ends that are urged apart by spring bias, the holder comprising:

a) a base having a broad upper surface, a broad lower surface, a rear end, and a forward end;

b) a depression in the upper surface; and c) a pair of upright elements extending upwardly from the upper surface on opposite sides of the depression for holding the tongs securely by the handle members of the tongs as the spring bias forces a first one of the handle members against one of the upright elements, and a second handle member against the other of the upright elements, while the depression is positioned to catch any drippings from the tongs.

3. The holder according to claim 2 further comprising stabilizing means on the lower surface for reducing movement of the holder on the support surface.

4. The holder according to claim 3 in which the stabilizing means is a high friction material.

5. The holder according to claim 3 in which the stabilizing means is at least one magnet.

6. The holder according to claim 3 in which the stabilizing means is at least one suction cup.

7. A holder for holding a pair of tongs securely in a sanitary manner on a support surface, the tongs having two elongate handle members pivotally joined at their first ends, with grasping second ends that are urged apart by spring bias, the holder comprising:

a) a base having a broad upper surface, a broad lower surface, a rear end, and a forward end;

b) two depressions in the upper surface; and c) a pair of upright elements extending upwardly from the upper surface on opposite sides of the two depressions for holding the tongs securely by the handle members of the tongs as the spring bias forces a first one of the handle members against one of the upright elements, and a second handle member against the other of the upright elements, while the depressions are positioned to catch any drippings from the tongs.

8. The holder according to claim 7 further comprising stabilizing means on the lower surface for reducing movement of the holder on the support surface.

9. The holder according to claim 7 in which the stabilizing means is a high friction material.

10. The holder according to claim 7 in which the stabilizing means is at least one magnet.

11. The holder according to claim 7 in which the stabilizing means is at least one suction cup.

\* \* \* \* \*